(12) United States Patent
Stokes et al.

(10) Patent No.: US 12,363,438 B2
(45) Date of Patent: Jul. 15, 2025

(54) ADJUSTABLE AQUACULTURE CAMERA MOUNTING SYSTEM

(71) Applicant: TidalX AI Inc, San Ramon, CA (US)

(72) Inventors: Matthew Stokes, Centennial, CO (US); Harrison Pham, Sunnyvale, CA (US); Thomas Robert Swanson, Sunnyvale, CA (US)

(73) Assignee: TidalX AI Inc., Mountain View, CA (US)

( * ) Notice: Subject to any disclaimer, the term of this patent is extended or adjusted under 35 U.S.C. 154(b) by 32 days.

(21) Appl. No.: 18/207,468

(22) Filed: Jun. 8, 2023

(65) Prior Publication Data
US 2024/0107168 A1    Mar. 28, 2024

Related U.S. Application Data

(60) Provisional application No. 63/410,767, filed on Sep. 28, 2022.

(51) Int. Cl.
*H04N 23/695*  (2023.01)
*G03B 17/56*   (2021.01)
(Continued)

(52) U.S. Cl.
CPC ......... *H04N 23/695* (2023.01); *G03B 17/561* (2013.01); *G06T 7/85* (2017.01);
(Continued)

(58) Field of Classification Search
CPC ...... H04N 23/695; H04N 23/90; H04N 23/64; G06T 7/85; G06V 10/25; G06V 20/05; G03B 17/561
See application file for complete search history.

(56) References Cited

U.S. PATENT DOCUMENTS

2016/0248985 A1   8/2016   Mate et al.
2018/0139374 A1*  5/2018   Yu .................. H04N 21/6587
(Continued)

FOREIGN PATENT DOCUMENTS

EP         3902236        10/2021
WO    WO 2020/046523       3/2020
(Continued)

OTHER PUBLICATIONS

International Search Report and Written Opinion in International Appln. No. PCT/US2023/031286, dated Dec. 4, 2023, 14 pages.

*Primary Examiner* — Thai Q Tran
*Assistant Examiner* — Jose M Mesa
(74) *Attorney, Agent, or Firm* — Fish & Richardson P.C.

(57) ABSTRACT

Methods, systems, and apparatus, including medium-encoded computer program products, for adjusting an aquaculture camera mounting system. A current combined field of view of two or more cameras that are mounted on an adjustable camera mounting structure in an environment can be determined based upon a current configuration of the adjustable camera mounting structure. A target field of view for the two or more cameras that are mounted on the adjustable camera mounting structure can be determined. Based at least on the field of view target and the current combined field of view, an adjustment parameter for the adjustable camera mounting structure can be determined. The adjustable camera mounting structure can be adjusted according to the adjustment parameter to provide a field of view in accordance with the field of view target.

17 Claims, 5 Drawing Sheets

(51) Int. Cl.
  *G06T 7/80* (2017.01)
  *G06V 10/25* (2022.01)
  *G06V 20/05* (2022.01)
  *H04N 23/60* (2023.01)
  *H04N 23/90* (2023.01)

(52) U.S. Cl.
  CPC .............. *G06V 10/25* (2022.01); *G06V 20/05* (2022.01); *H04N 23/64* (2023.01); *H04N 23/90* (2023.01)

(56) References Cited

U.S. PATENT DOCUMENTS

2020/0337274 A1  10/2020  Russel et al.
2021/0072017 A1* 3/2021  Kitagawa ............... G01B 11/14

FOREIGN PATENT DOCUMENTS

WO   WO 2022/109855   6/2022
WO   WO 2022/171267   8/2022

* cited by examiner

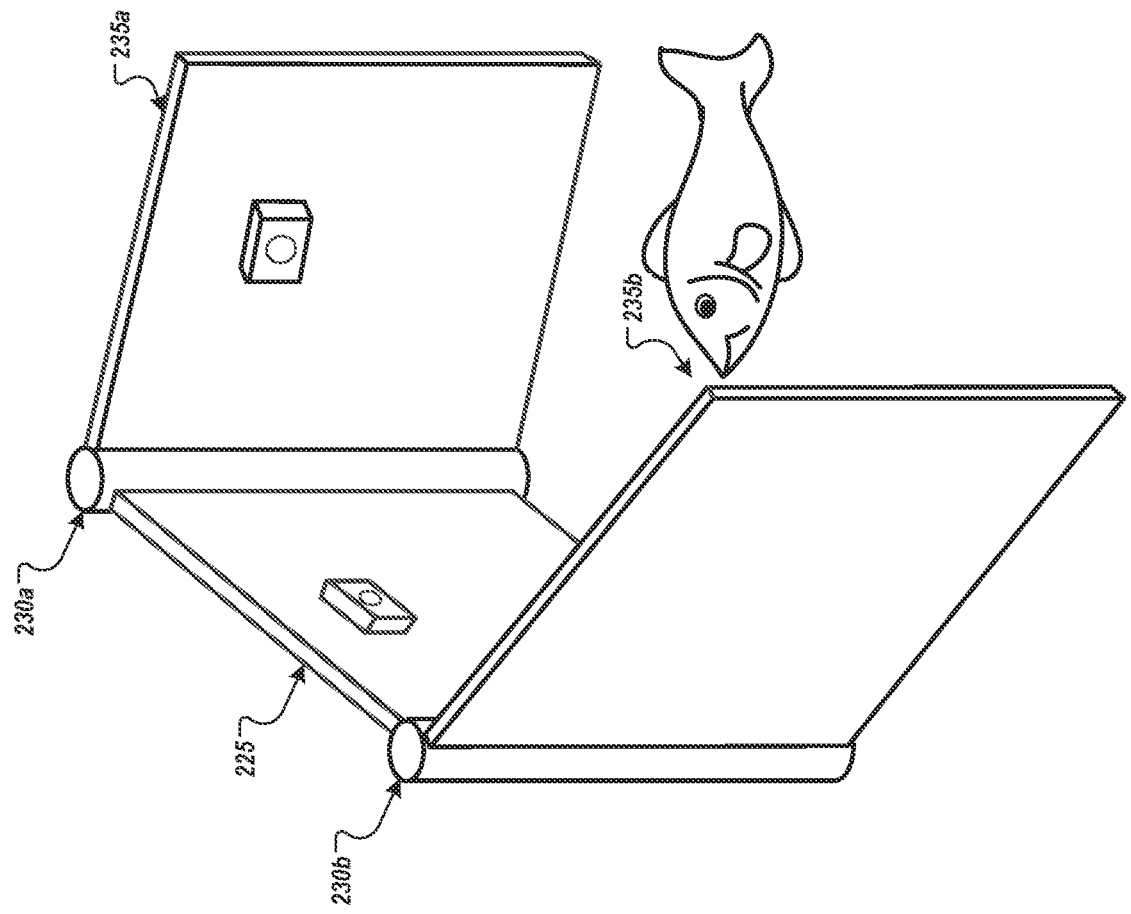

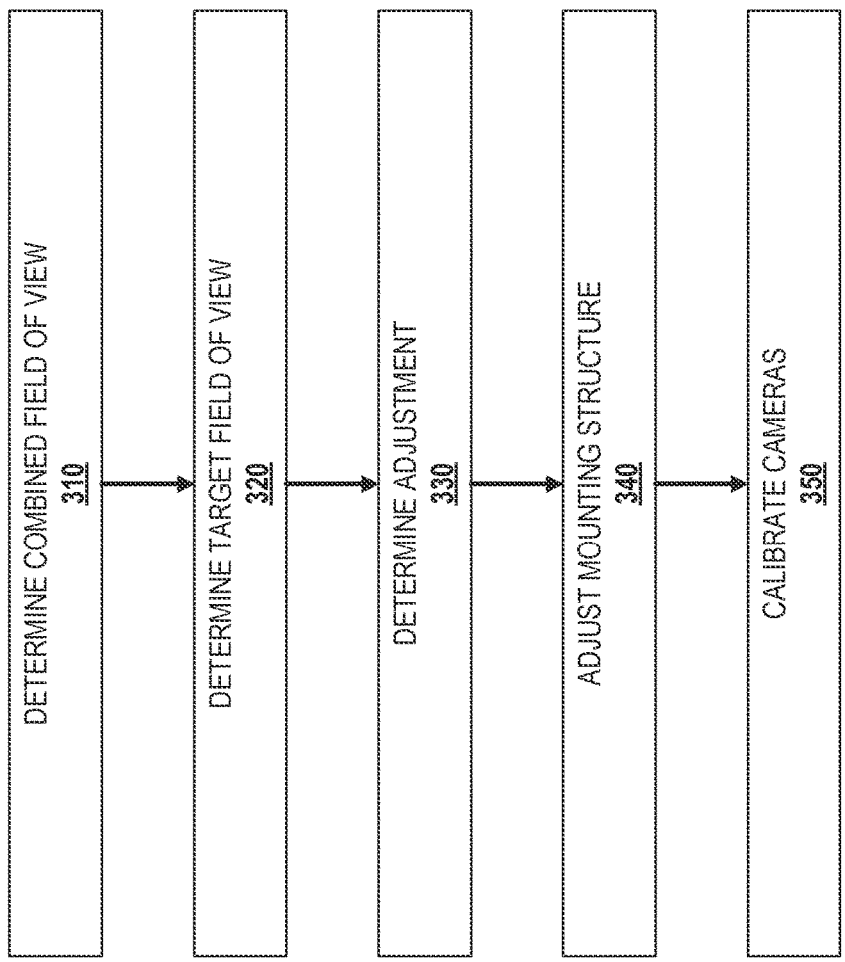

ADJUSTABLE AQUACULTURE CAMERA MOUNTING SYSTEM

CLAIM OF PRIORITY

This application claims priority under 35 USC § 119(e) to U.S. Patent Application Ser. No. 63/410,767, filed on Sep. 28, 2022, the entire contents of which are hereby incorporated by reference.

FIELD

This specification relates to adjustable, multi-camera mounting systems.

BACKGROUND

A system can use multiple cameras to provide panoramic views of a scene, and to perform distance, or 'depth,' estimation. Camera mounts can hold the multiple cameras in particular positions or orientations, to enable the cameras to capture images of a particular region of interest.

SUMMARY

This specification describes technologies relating to an adjustable aquaculture camera mounting system that includes multiple cameras that are configured to capture images of an aquaculture environment. The shape, configuration, mode and/or position of the camera mount can be adjusted in response to signals created by the system, e.g., when the system determines that adjustments are needed to improve image quality and/or in response to signals received from other systems.

Particular embodiments of the subject matter described in this specification can be implemented so as to realize one or more of the following advantages. The techniques described below can be used to adjust the field of view of cameras attached to a camera mount in an aquaculture environment. Such adjustments can be beneficial since conditions within an aquaculture environment can change frequently. For example, when turbidity increases, narrowing the field of view can increase the quality (e.g., clarity, lighting, etc.) of the images taken by the cameras. Conversely, in clearer waters, expanding the field of view can provide image data for a broader region of the environment, which can be beneficial to certain aquaculture management tasks, such as biomass estimation. In addition, techniques of this specification enable more flexible data collection without requiring additional cameras. Since adding cameras increases system complexity, including complexity relating to the maintenance of the cameras within a challenging aquatic environment, eliminating the need to add cameras simplifies the system, thus providing a technical benefit.

One aspect features determining a current combined field of view of two or more cameras that are mounted on an adjustable camera mounting structure in an environment based upon a current configuration of the adjustable camera mounting structure. A target field of view for the two or more cameras that are mounted on the adjustable camera mounting structure can be determined. Based at least on the field of view target and the current combined field of view, an adjustment parameter for the adjustable camera mounting structure can be determined. The adjustable camera mounting structure can be adjusted according to the adjustment parameter to provide a field of view in accordance with the field of view target.

One or more of the following features can be included. In response to adjusting the adjustable camera mounting structure, the two or more cameras can be calibrated. The calibration can be performed with respect to a known fixed location in an aquaculture environment. The two or more cameras can be attached to a mount, and the calibration can be performed with respect to a location on the mount. The adjustable camera mounting structure can be a flexible mount. The adjustable camera mounting structure can include at least one hinge. The environment can be an aquaculture environment. The adjustment parameter for the adjustable camera mounting structure can be determined at least in part from at least one image captured by at least one of the two or more cameras.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

FIGS. 2A-2C shows views of a hinged camera mount.

FIG. 3 is a flow diagram of an example process for adjusting an aquaculture camera mounting system in an aquaculture environment.

DETAILED DESCRIPTION

Figure 1:
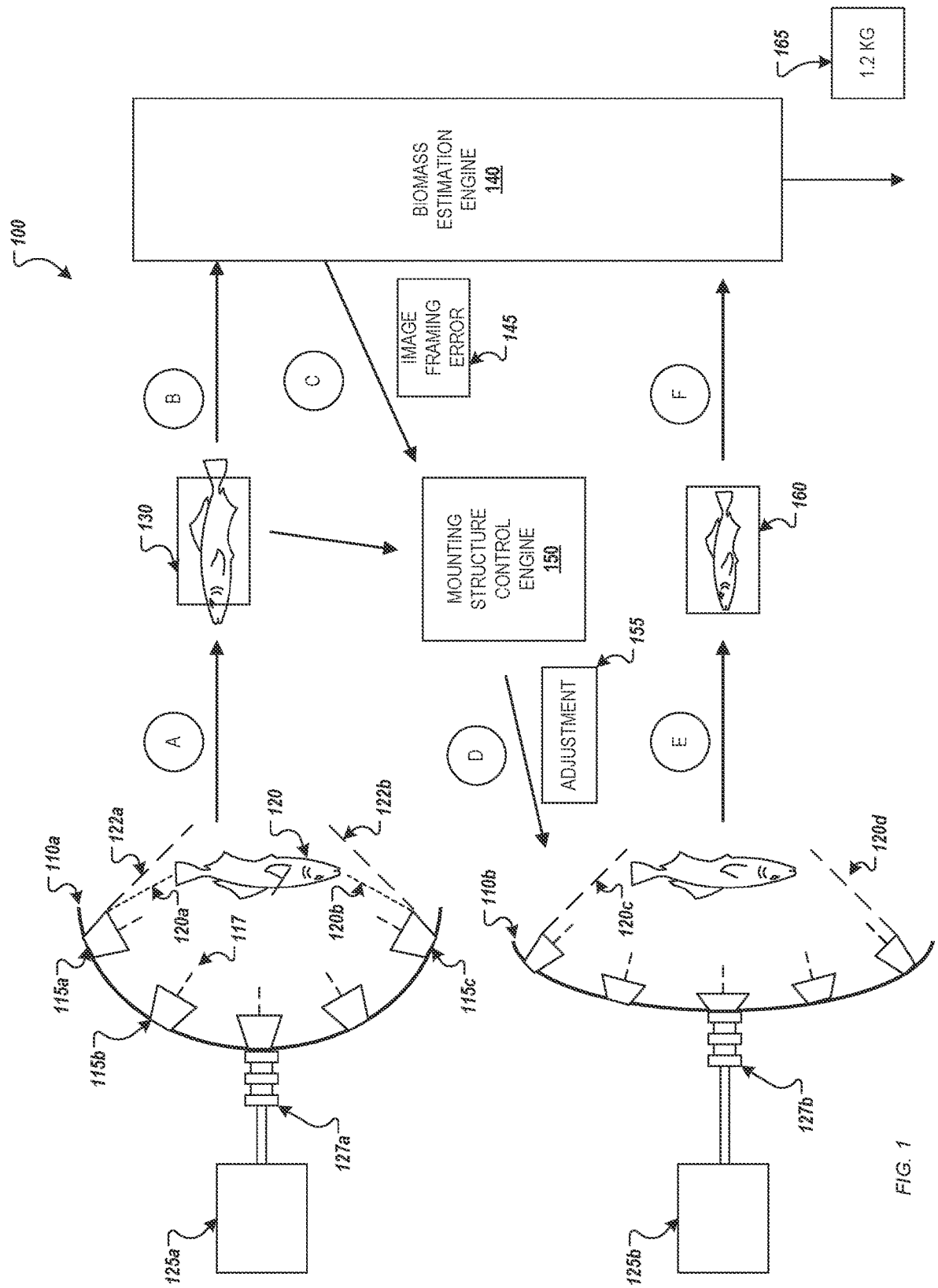
FIG. 1 shows an example of an environment for adjusting an aquaculture camera mounting system in aquaculture environment.

FIG. 1 shows an example environment for adjusting an aquaculture camera mounting system in an aquaculture environment. For context, aquaculture includes the farming of marine organisms such as fish, algae, seaweed, crustaceans and mollusks. Aquaculture is important to the health of marine ecosystems, which can suffer from overharvesting. Experience indicates over half of all fish and shellfish consumed by humans come from aquaculture, and in the absence of aquaculture, substantial, and perhaps irreversible, strain on marine ecosystems could result.

In addition, aquaculture can play an important role in mitigating climate change. It has been found that relative to other livestock farming, marine aquaculture operations typically have a smaller carbon footprint, and require less land and fresh water. They are more efficient at converting feed into protein for human consumption than beef, pork, and poultry. Further, aquaculture tends to be more resilient to the impacts of climate change, as many aquaculture operations are safe from tornados, droughts, floods, and other land-based extreme events that may increase with climate change.

To manage an aquaculture environment effectively, e.g., providing feed at the proper time, in the proper amount and at proper locations, data related to the environment can be collected and used to determine appropriate environmental actions. For example, cameras can take images of the environment, and the images can be used to determine the location distribution of livestock, estimate the biomass of the livestock, determine livestock health (e.g., by detecting the presence of parasites), and so on. Such information can be used to influence aquaculture operations relating to feeding, parasite mitigation, harvesting and so on.

Stereo cameras can provide images that are particularly useful for managing aquaculture environments. A stereo camera is a type of camera with two or more camera subsystems, and images from the camera subsystems can be digitally combined to produce a richer view of the environment. For example, including multiple camera subsystems allows the stereo camera to capture three-dimensional images, which can provide a depth component to the images. In addition, combining images from multiple cameras can increase the overall field of view as compared to the field of view of a single camera.

However, because aquaculture environments are dynamic systems, non-adjustable mounting structures for the camera subsystem can limit the effectiveness of the stereo camera. For example, as livestock change positions, a non-adjustable mounting structure might provide too narrow a view of the region, and if turbidity increases, images from cameras coupled to a non-adjustable mounting structure might have too little light to permit accurate analysis.

In contrast, the adjustable mounts of this specification can be adapted in response to the conditions. For example, as turbidity increases, adjusting the camera mount to increase convexity can bring the camera subsystems closer to the image subjects, improving the clarity of the images. In addition, concavity can provide more overlap among camera subsystems, improving low-light performance as compared to move convex arrangements. Further, increased concavity can improve the accuracy of depth estimation. Conversely, if water is clear and the livestock are distant from the mounting structure, increasing convexity can broaden the combined field of view of the aquaculture environment, and the increased field of view can help correct for occlusions. In addition, a broader combined field of view provides images that include larger areas of the pen, enabling aquaculture management systems (e.g., biomass estimation systems) to function more accurately as they receive images that reflect a larger sample of the environment. For example, images from a broader combined field of view can include more livestock, and can be used to make more accurate determinations of track length of individual livestock. Both factors can improve biomass estimates.

With that background in mind, and looking at FIG. 1, the environment can include an adjustable camera mount 110a, 110b (collectively camera mount 110), camera subsystems 115a, 115b, 115c (collectively camera subsystems 115), a camera mount controller 125a, 125b (collectively camera mount controller 125), one or more aquaculture management systems such a biomass estimation engine 140 and a mounting structure control engine 150.

The adjustable camera mount 110 can be constructed of any suitable material, including bendable materials such as flexible metals, plastics or rubber. The camera mount can also or instead include hinges or flexible points that permit segments of the adjustable camera mount, including rigid segments and bendable segments, to be adjusted.

Figure 2A:
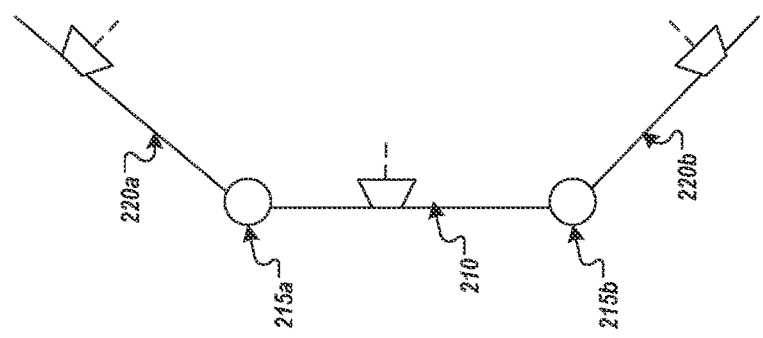
Figure 2B:
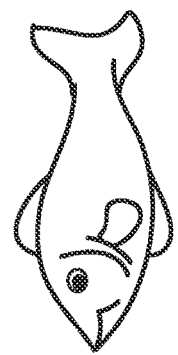

FIGS. 2A-2C shows views of a hinged camera mount. FIG. 2A shows a top view of an adjustable camera mount 210, which can include multiple hinges 215a, 215b. The hinges 215a, 215b can enable adjustments to the shape of the adjustable camera mount. The angle of each arm 220a, 220b can be changed independently or the angles of the arms 220a, 220b can be the same. The hinges can be actuated by solid-state actuators or other actuator types. FIGS. 2B and 2C show side views of a hinged camera mount 225. In FIG. 2B, the side arms 235a, 235b of the hinged camera mount 225 have been rotated around the hinges 230a, 230b such that they positioned to capture a large current field of view, e.g., with a target fish is located further away from the mount 225. In FIG. 2C, the side arms 235a, 235b of the hinged camera mount 225 have been rotated around the hinges 230a, 230b such that they are positioned to capture a smaller current field of view, e.g., to capture an image of a target fish that is located closer to the mount 225.

Returning to FIG. 1, multiple camera subsystems 115 can be mounted to the adjustable camera mount 110. The cameras in the camera subsystems 115 can be of a single type (e.g., high-frame rate still cameras) or a combination of multiple types (e.g., high-frame rate still high-frame rate still cameras and multi-spectral camera), and any number of camera subsystems 115 greater than one can be included. Each camera subsystem 115 can include multiple cameras, for example when each camera subsystem 115 is a stereo camera.

Using multiple camera types enables the system to adapt to changing water conditions, such as increased turbidity as certain types of cameras can operate more effectively in cloudy water. In addition, capturing images across the imaging spectrum enables the system to use the imaging parameters that provide accurate readings of the aquaculture environment. Using multiple cameras of the same type provides redundancy that enables the system to discard images captured by faulty cameras, such as cameras that have failed or become obscured by biofouling. Combining cameras of the same type of camera for redundancy and multiple camera types for breadth of coverage provides both benefits.

The camera mount controller 125 can adjust the shape of the adjustable camera mount 115 using any appropriate mechanism. For example, the camera mount controller 125 can include a piston 127a, 127b (collectively referred to as piston 127) that is coupled to the adjustable camera mount 115. As the piston 127 coupled to the camera mount controller 125 extends and retracts, the shape of the adjustable camera mount 115 is altered. Extending the piston can cause the adjustable camera mount 115 to become more convex, increasing the combined field of view, and retracting the piston can cause the adjustable camera mount 115 to become more concave, reducing the combined field of view, but drawing the cameras 115 nearer to a certain subject.

In another example, the camera mount controller 125 can include a pulley and wire that is coupled to the adjustable camera mount 115. Releasing cable can cause the adjustable camera mount 115 to become more convex, and retracting cable can cause the adjustable camera mount 115 to become more concave. Further, the camera mount controller 125 can include any number of adjustment devices that are coupled to the adjustable camera mount 115. For example, if the adjustable camera mount 115 includes multiple segments, each segment can be controlled by a separate adjustment device, or multiple segments can be controlled by a single adjustment device. In addition, in some implementations, the camera mount controller 125 can adjust the position of the adjustable camera mount 115 by moving it along the x-, y- and z-axes. In other embodiments, magnets or electrical stimulation are used to change the shape of the mount 115.

In the example of FIG. 1, the camera subsystems 115 have a combined field of view illustrated by lines 120a and 120b (collectively referred to as combined field of view 120). In stage A, using the camera subsystems 115 in its current configuration results in an image 130 that does not properly contain the livestock, as part of the livestock is outside of the image.

In stage B, the captured image 130 can be delivered to one or more aquaculture management systems, such as a biomass estimation engine 140 and to a mounting structure control engine 150. The biomass estimation engine 140 can use the image 130 to determine a biomass estimation.

However, in this this example, the current combined field of view 120 for the image is more narrow than the target field of view 122a, 122b (collectively referred to as target field of view 122), which causes a fault, such as an image framing error 145, in the biomass estimation engine 140. In stage C, the biomass estimation engine 140 can deliver the image framing error 145 to the mounting structure control engine 150.

In response to receiving the image framing error 145, the mounting structure control engine 150 can determine that the combined field of view 120 should be increased to satisfy the target field of view 122. As noted above, increasing the combined field of view 120 can correspond to increasing the convexity of the camera mount 110.

In stage D, the mounting structure control engine 150 can determine and deliver an adjustment parameter 155 to the camera mount controller 125. The mounting structure control engine 150 can determine the adjustment parameter 155 by analyzing the image 1230 in light of the error 145. The adjustment parameter 155 can be one or more values that define an adjustment to be made by the camera mount controller 125. For example, the adjustment parameter can include the number of degrees of rotation to be applied in the x-, y- and z-axes. In another example, the adjustment parameter 155 can include a length of extension or contraction by a controller piston 127. In still another example, the adjustment parameter 155 can include an angle of change to one or more hinges included in the camera mount 110.

In response to receiving the adjustment 155, the camera mount controller 125 can adjust the camera mount 110, in this example, to increase convexity. In various implementations, the adjustment by the camera mount controller 125 can include extending or retracting a controller piston 127 and adjusting segments of the camera mount 110 at a hinge included in the camera mount 110, among other possible adjustments.

In stage E, camera subsystems 115 can capture an image 160 when the camera mount 110 is adjusted such that the combined field of view 120c, 120d matches the target field of view 122. As such, the image 160 is properly framed and can be delivered (stage F) to the biomass estimation engine 140. The biomass estimation engine 140 uses the image 160 to produce a biomass estimation 165.

Figure 2B:
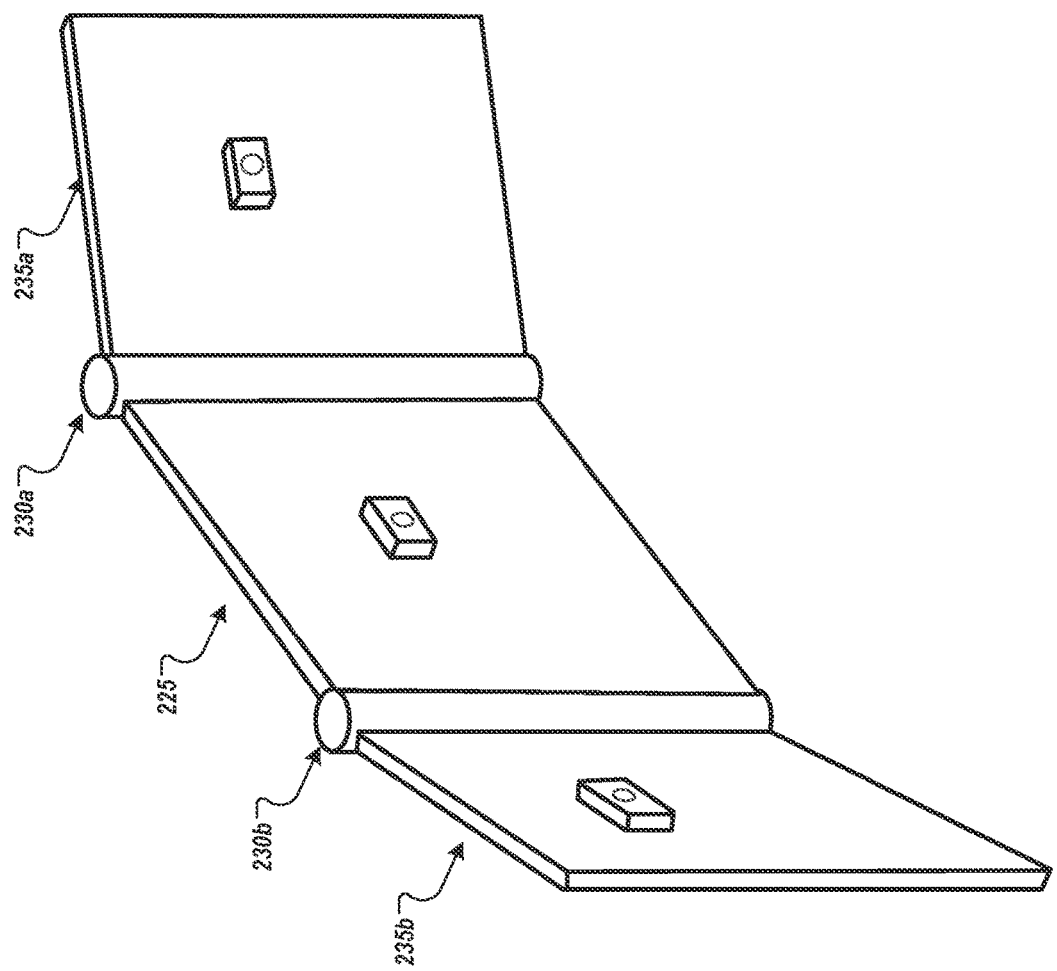

FIG. 3 is a flow diagram of an example process for adjusting an aquaculture camera mounting system in an aquaculture environment. For convenience, the process 300 will be described as being performed by a system for adjusting an aquaculture camera mounting system, e.g., the mounting structure control engine 205 of FIG. 2, appropriately programmed to perform the process. Operations of the process 300 can also be implemented as instructions stored on one or more computer readable media which may be non-transitory, and execution of the instructions by one or more data processing apparatus can cause the one or more data processing apparatus to perform the operations of the process 300. One or more other components described herein can perform the operations of the process 300.

The system determines (310) a current combined field of view of two or more cameras that are mounted on an adjustable camera mounting structure. The determination can be based upon a current configuration of the adjustable camera mounting structure.

In some implementations, the system can determine the field of the view of the outermost cameras on the structure (e.g., cameras 115a and 115c of FIG. 1), and determine the field of view of the current configuration as the union of those fields of view. In some implementations, the system can determine the field of the view of each camera on the structure, and determine the field of view of the current configuration of the cameras as the union of those fields of view. The field of view of each camera can be determined using the area of view of the camera, the position of the camera and the angle of the camera. The perimeter of view of a camera is a fixed parameter that depends on the optics of the camera and the attached lens. The position of the camera depends on the location of the adjustable camera mount, which can be determined using location sensors coupled to the mount. The angle of the camera can be determined using various techniques. For example, the angle of a camera can be determined from a sensor coupled to the camera, or from the current configuration (e.g., the amount of concavity) of the adjustable camera mounting structure.

The system determines (320) a target field of view for the two or more cameras that are mounted on the adjustable camera mounting structure. In some implementations, the target field of view can be one or more configuration values provided to the system. For example, the system can include an Application Programming Interface (API), which, when called by an authorized operator (which can be a human operator or a computer program), enables the operator to provide configuration values that define the target field of view. The target field of view can be a fixed field of view within the environment or a field of view relative to the position of the camera mount.

In some implementations, the target field of view can be defined relative to the current field of view. For example, the system can receive an indication that the combined field of view for an image produced by the system failed to satisfy a necessary field of view, e.g., the image framing error 145 of FIG. 1. In response to receiving the indication, the system can determine a target field of view that remediates the error. In cases where the current field of view is smaller than a necessary field of view, the system can determine a target field of view that is broader than the current field of view. Conversely, if the current field of view is too broad, e.g., resulting in poor image quality or insufficient lighting, the system can determine a target field of view that is narrower than the current field of view.

The system determines (330), based at least on the field of view target and the current combined field of view, an adjustment for the adjustable camera mounting structure. If the target field of view is larger than the current combined field of view, the adjustment can result in increasing the current of view; if the target field of view is smaller than the current field of view, the adjustment can result in decreasing the current field of view.

Parameters defining the adjustment can be computed using various techniques. For example, the system can increase or decrease the current field of view by a fixed percentage (e.g., 2%, 5%, 10%, etc.), by a range of percentages (e.g., 10% for a first adjustment, 5% for a second adjustment, 2.5% for a third adjustment, and so on), or based on the magnitude of the error (e.g., larger errors can correspond to larger adjustments and smaller errors can correspond to smaller adjustments). Other techniques for determining a target field of view can also be used.

The system causes an adjustment (340) to the adjustable camera mounting structure according to the adjustment parameter to provide a field of view in accordance with the field of view target. The system can deliver data that includes the adjustment to a camera mount controller configured to accept the adjustment, causing the adjustable camera mounting structure to be adjusted. In some implementations, the adjustable camera mounting structure can be a component within the system, and the system can actuate the adjustable camera mounting structure according to the adjustment parameter.

In some implementations, in response to adjusting the adjustable camera mounting structure (e.g., as described in reference to operation 340), the system can calibrate at least a subset of the cameras coupled to the adjustable camera mounting structure using any appropriate technique, e.g., by applying image rectification to images of a particular location taken by the cameras being calibrated. For example, the system can calibrate the cameras with respect to a fixed location within the aquaculture environment, e.g., a location on netting surrounding the pen, a location of a fixed piece of equipment within the pen (e.g., a sensor such as a temperature or light sensor). The system can include a calibration image at such a location. In another example, the system can perform calibration with respect to a location on the mount. The mount can include a fixed calibration target, e.g., extending out from the mount and/or the mount can include a movable calibration target, such an arm that can be extended by the system to enable calibration.

While this specification has largely described adjusting a camera mounting system in an aquaculture environment, the techniques can also be applied in other environments. For example, the mounting system can be present within an agriculture environment, e.g., to capture images of land-dwelling livestock such as cows, pigs, chickens, goats, and so on.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, special purpose microprocessors. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

To provide for interaction with a user, embodiments of the subject matter described in this specification can be implemented on a computing device capable of providing information to a user. The information can be provided to a user in any form of sensory format, including visual, auditory, tactile or a combination thereof. The computing device can be coupled to a display device, e.g., an LCD (liquid crystal display) display device, an OLED (organic light emitting diode) display device, another monitor, a head mounted display device, and the like, for displaying information to the user. The computing device can be coupled to an input device. The input device can include a touch screen, keyboard and a pointing device, e.g., a mouse or a trackball, by which the user can provide input to the computing device. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Thus, unless explicitly stated otherwise, or unless the knowledge of one of ordinary skill in the art clearly indicates otherwise, any of the features of the embodiments described above can be combined with any of the other features of the embodiments described above.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

What is claimed is:

1. A computer implemented method comprising:
   determining a current combined field of view of two or more cameras that are mounted on an adjustable, flexible, curved camera mounting structure in an environment, based upon a current configuration of the adjustable camera mounting structure;
   determining a target field of view for the two or more cameras that are mounted on the adjustable camera mounting structure;
   determining, based at least on the field of view target and the current combined field of view, an adjustment parameter for making the adjustable camera mounting structure more convex or more concave; and
   adjusting the adjustable camera mounting structure according to the adjustment parameter for making the adjustable camera mounting structure more convex or more concave, to provide a different, combined field of view in accordance with the field of view target.

2. The computer implemented method of claim 1 further comprising:
   in response to adjusting the adjustable camera mounting structure, calibrating the two or more cameras.

3. The computer implemented method of claim 2 wherein the calibration is performed with respect to a known fixed location in an aquaculture environment.

4. The computer implemented method of claim 2 wherein the two or more cameras are attached to a mount, and the calibration is performed with respect to a location on the mount.

5. The computer implemented method of claim 1, wherein the adjustable camera mounting structure includes at least one hinge.

6. The computer implemented method of claim 1, wherein the environment is an aquaculture environment.

7. The computer implemented method of claim 1, wherein the adjustment parameter for the adjustable camera mounting structure is determined at least in part from at least one image captured by at least one of the two or more cameras.

8. A system comprising one or more computers and one or more storage devices storing instructions that when executed by the one or more computers cause the one or more computers to perform operations comprising:
   determining a current combined field of view of two or more cameras that are mounted on an adjustable, flexible, curved camera mounting structure in an environment, based upon a current configuration of the adjustable camera mounting structure;
   determining a target field of view for the two or more cameras that are mounted on the adjustable camera mounting structure;
   determining, based at least on the field of view target and the current combined field of view, an adjustment parameter for making the adjustable camera mounting structure more convex or more concave; and
   adjusting the adjustable camera mounting structure according to the adjustment parameter for making the adjustable camera mounting structure more convex or more concave, to provide a different, combined field of view in accordance with the field of view target.

9. The system of claim 8 further comprising: in response to adjusting the adjustable camera mounting structure, calibrating the two or more cameras.

10. The system of claim 9 wherein the calibration is performed with respect to a known fixed location in an aquaculture environment.

11. The system of claim 9 wherein the two or more cameras are attached to a mount, and the calibration is performed with respect to a location on the mount.

12. The system of claim 8, wherein the adjustable camera mounting structure includes at least one hinge.

13. The system of claim 8, wherein the environment is an aquaculture environment.

14. The system of claim 8, wherein the adjustment parameter for the adjustable camera mounting structure is determined at least in part from at least one image captured by at least one of the two or more cameras.

15. One or more non-transitory computer-readable storage media storing instructions that when executed by one or more computers cause the one or more computers to perform operations comprising:
    determining a current combined field of view of two or more cameras that are mounted on an adjustable, flexible, curved camera mounting structure in an environment, based upon a current configuration of the adjustable camera mounting structure;
    determining a target field of view for the two or more cameras that are mounted on the adjustable camera mounting structure;
    determining, based at least on the field of view target and the current combined field of view, an adjustment parameter for making the adjustable camera mounting structure more convex or more concave; and
    adjusting the adjustable camera mounting structure according to the adjustment parameter for making the adjustable camera mounting structure more convex or more concave, to provide a different, combined field of view in accordance with the field of view target.

16. The one or more non-transitory computer-readable storage media of claim 15, the operations further comprising: in response to adjusting the adjustable camera mounting structure, calibrating the two or more cameras.

17. The one or more non-transitory computer-readable storage media of claim 15, wherein the environment is an aquaculture environment.

* * * * *